US011808350B2

(12) United States Patent
Kitano

(10) Patent No.: US 11,808,350 B2
(45) Date of Patent: Nov. 7, 2023

(54) VEHICLE

(71) Applicant: YAMAHA HATSUDOKI KABUSHIKI KAISHA, Iwata (JP)

(72) Inventor: Shinji Kitano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 17/960,930

(22) Filed: Oct. 6, 2022

(65) Prior Publication Data
US 2023/0113399 A1 Apr. 13, 2023

(30) Foreign Application Priority Data

Oct. 8, 2021 (JP) ................ 2021-166503

(51) Int. Cl.
*F16H 57/01* (2012.01)
*F16H 61/662* (2006.01)
(Continued)

(52) U.S. Cl.
CPC ......... *F16H 61/66259* (2013.01); *F16H 9/16* (2013.01); *F16H 59/18* (2013.01)

(58) Field of Classification Search
CPC ...... F16H 61/66259; F16H 9/16; F16H 59/18; F16H 57/01; F16H 57/2061; F16H 57/6629; F16H 2057/014
See application file for complete search history.

(56) References Cited

U.S. PATENT DOCUMENTS 6,622,072 B2 *  9/2003  Asumi ............. F16H 61/66272
                                                       477/44
10,672,207 B2 *  6/2020  Carlson ............. B60W 50/0205
(Continued)

FOREIGN PATENT DOCUMENTS

JP        S62255242 A    11/1987
JP        H0549451 U      6/1993
(Continued)

OTHER PUBLICATIONS

Extended European Search Report in 22200273.5, dated Jan. 19, 2023, 9 pages.
Office Action in JP2021-166503, dated Jun. 20, 2023, 7 pages.

*Primary Examiner* — Sherry L Estremsky
(74) *Attorney, Agent, or Firm* — KEATING AND BENNETT, LLP

(57) ABSTRACT

A vehicle includes an engine, a continuously variable transmission including an endless belt to output a power from the engine, and a transmission to which the power from the continuously variable transmission is transmitted. If the vehicle travel speed is not smaller than a first threshold value and an accelerator opening degree is not smaller than a second threshold value, a controller determines that the continuously variable transmission is being used in a belt high-load situation. If a travel distance in the belt high-load situation is not smaller than a third threshold value, the controller determines that the endless belt is deteriorated or deterioration thereof is in an advanced stage, and a deterioration message about the endless belt is displayed on a display based on an instruction from the controller. A situation in which a speed changing ratio of the continuously variable transmission is not greater than a fourth threshold value may be determined as the belt high-load situation.

12 Claims, 12 Drawing Sheets

(51) Int. Cl.
*F16H 9/16* (2006.01)
*F16H 59/18* (2006.01)

(56) References Cited

U.S. PATENT DOCUMENTS

| | | |
|---|---|---|
| 2002/0093423 A1 | 7/2002 | Asumi et al. |
| 2007/0123385 A1 | 5/2007 | Shimazu et al. |
| 2015/0284003 A1 | 10/2015 | Gauthier et al. |
| 2018/0038460 A1 | 2/2018 | Honjo |
| 2018/0141425 A1 | 5/2018 | Uezu |
| 2019/0061450 A1 | 2/2019 | Hayashi et al. |

FOREIGN PATENT DOCUMENTS

| | | | |
|---|---|---|---|
| JP | 2002068070 A | | 3/2002 |
| JP | 2002-213548 A | | 7/2002 |
| JP | 2004243924 A | * | 9/2004 |
| JP | 2005265059 A | | 9/2005 |
| JP | 4093007 B2 | | 5/2008 |
| JP | 4358184 B2 | | 11/2009 |
| JP | 2010078025 A | | 4/2010 |
| JP | 2011196426 A | | 10/2011 |
| JP | 5282317 B2 | | 9/2013 |
| JP | 2018-079884 A | | 5/2018 |
| JP | 2019-038303 A | | 3/2019 |
| JP | 2019158117 A | | 9/2019 |
| JP | 2020041675 A | | 3/2020 |
| JP | 6770849 B2 | | 10/2020 |
| JP | 2021042806 A | | 3/2021 |
| WO | 2020049525 A2 | | 3/2020 |

\* cited by examiner

LOW state

TOP state

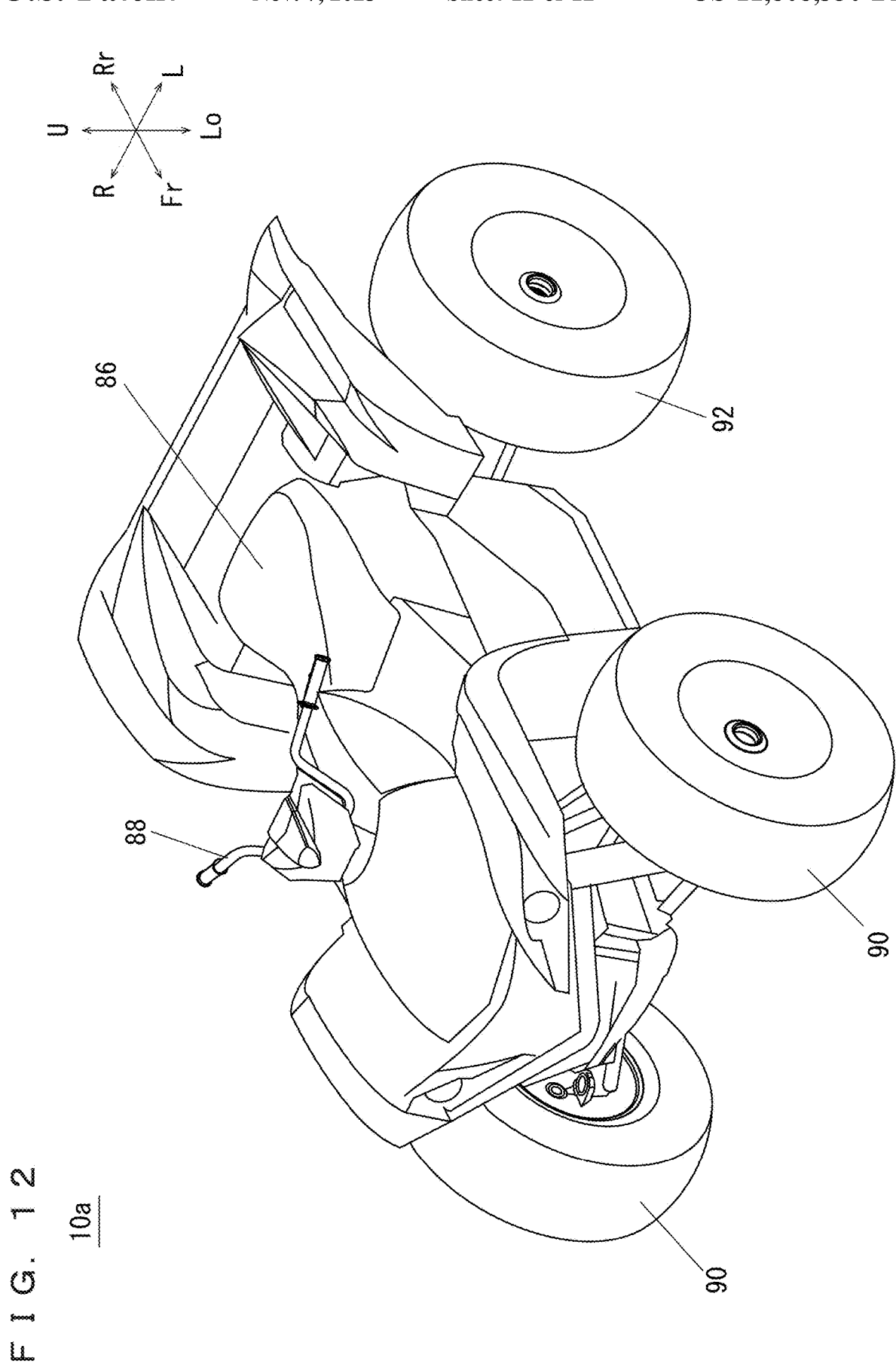

VEHICLE

CROSS REFERENCE TO RELATED APPLICATIONS

This application claims the benefit of priority to Japanese Patent Application No. 2021-166503 filed on Oct. 8, 2021. The entire contents of this application are hereby incorporated herein by reference.

BACKGROUND OF THE INVENTION

1. Field of the Invention

The present invention relates to vehicles, and more specifically to vehicles including a continuously variable transmission including an endless belt.

2. Description of the Related Art

Conventionally, an endless belt of a continuously variable transmission mounted on a vehicle wears as it is used and must be replaced. Therefore, a variety of devices have been proposed to detect a time of replacement of the endless belt.

As an example of conventional techniques of this kind, JP-A 2002-213548 discloses a belt replacement advisory device for a belt-type automatic transmission device in which a drive pulley and a driven pulley vary their winding diameters of the endless belt to change a speed changing ratio. In this device, if an actual speed changing ratio of the automatic transmission device exceeds a reference speed changing ratio which is greater than a set speed changing ratio, and this condition has continued for a predetermined period of time under a specific operating condition of the vehicle, then that timing is determined as a time for replacement of the endless belt and a determination result is displayed in a display device. In other words, in the device disclosed in JP-A 2002-213548, the replacement time of the endless belt is determined by measuring a time of duration for which an amount of difference between the speed changing ratio of a new endless belt and the speed changing ratio of a deteriorated endless belt is greater than a predetermined value under a certain identical operating condition of the vehicle. In other words, as far as the difference in the speed changing ratios is within a predetermined range, there is no timer count down and no accumulated time is obtained. JP-A 2002-213548 also refers to measuring of an accumulated travel distance, but the accumulated travel distance is measured even when there is no difference in the speed changing ratios, for example.

Also, JP-B2 P5282317 discloses a method for monitoring operational reliability of a transmittance device which is capable of varying a transmission ratio on a stepless basis and transmits torque by means of frictional engagement. In this method, a damage amount model is prepared which takes such operational parameters into account as a temperature at a place of frictional engagement, an amount of press-fit between members which make frictional engagement, an amount of slippage between the members which make the frictional engagement, a place of the frictional engagement, and duration of the frictional engagement. The damage amount model gives amounts of wear of winding means such as pulleys and belts. The amounts of wear are accumulated and displayed.

In a vehicle which is equipped with a continuously variable transmission including an endless belt, there is a big difference between an up and down driving where the vehicle accelerates and decelerates repeatedly and a normal driving where the vehicle travels at a generally predetermined speed, in a total travel distance until the endless belt deteriorates to a point of breakage. It is impossible in the methods disclosed in JP-A 2002-213548 and JP-B2 P5282317 to determine the deterioration of the endless belt of such a vehicle accurately. In particular, it is impossible in the methods disclosed in JP-A 2002-213548 and JP-B2 P5282317 to detect deterioration of the endless belt accurately in an up and down driving.

SUMMARY OF THE INVENTION

Therefore, preferred embodiments of the present invention provide vehicles each able to determine a deterioration of an endless belt easily and accurately.

According to a preferred embodiment of the present invention, a vehicle includes a prime mover, a continuously variable transmission including an endless belt to output a power from the prime mover, a detector to detect a use of the continuously variable transmission in a belt high-load situation, and a controller configured or programmed to determine a deterioration of the endless belt based on an accumulated value regarding the use of the continuously variable transmission in the belt high-load situation detected by the detector.

According to a preferred embodiment of the present invention, it was discovered for the first time that there is little difference between an up and down driving and a normal driving in terms of a travel distance in a belt high-load situation until the time when an endless belt deteriorates to a point of breakage. Therefore, in contrast to the device disclosed in JP-A 2002-213548 which simply measures the accumulated travel distance regardless of the state of travel and so on, preferred embodiments of the present invention enable determination of a deterioration of the endless belt easily and accurately by utilizing an accumulated value regarding the use, such as travel distance in the belt high-load situation, regardless of the travel mode of the vehicle such as the up and down driving and the normal driving.

Preferably, the belt high-load situation includes a situation in which the vehicle travels at a speed not slower than a predetermined speed. In this case, the situation in which the vehicle travels at the speed not smaller than the predetermined speed is highly correlated with deterioration of the endless belt, and therefore, it is possible to determine a deterioration of the endless belt accurately.

Further preferably, the belt high-load situation includes a situation in which the vehicle travels at an accelerator opening degree not smaller than a predetermined degree. In this case, the situation in which the vehicle travels at the accelerator opening degree not smaller than the predetermined degree is highly correlated with deterioration of the endless belt, and therefore, it is possible to determine a deterioration of the endless belt accurately.

Further, preferably, the belt high-load situation includes a situation in which the vehicle travels at a speed changing ratio of the continuously variable transmission not greater than a predetermined value. In this case, the situation in which the vehicle travels at the speed changing ratio of the continuously variable transmission not greater than the predetermined value is highly correlated with deterioration of the endless belt, and therefore, it is possible to determine a deterioration of the endless belt accurately.

Preferably, the accumulated value includes a travel distance. In this case, there is little difference, as described above, between the up and down driving and the normal driving, in the travel distance until the endless belt deteriorates to a point of breakage in the belt high-load situation, and therefore, it is possible, by utilizing the travel distance in the belt high-load situation, to determine the deterioration of the endless belt accurately.

Further preferably, the vehicle further includes an alarm to provide notification of a deterioration of the endless belt. In this case, the notification enables the driver to recognize the deterioration of the endless belt easily.

Further, preferably, the alarm provides notification of a change in the speed changing ratio of the continuously variable transmission. In this case, the arrangement enables the driver to recognize conditions of the endless belt by further taking into consideration information indicating the changes of the speed changing ratio of the continuously variable transmission.

Preferably, the vehicle further includes a transmission to receive a power speed-changed by the continuously variable transmission.

Further preferably, the prime mover includes an output shaft, and the continuously variable transmission includes a primary shaft coaxial with the output shaft.

Further, preferably, the vehicle further includes a side-by-side seat above or ahead of the continuously variable transmission. A preferred embodiment of the present invention is suitably applied to an ROV (Recreational Off-Highway Vehicle) configured as described above.

Preferably, the vehicle further includes a straddle seat above or ahead of the continuously variable transmission, a bar handle higher than the straddle seat, and three or more wheels lower than the bar handle. A preferred embodiment of the present invention is suitably applied to an ATV (All Terrain Vehicle) configured as described above.

In a preferred embodiment of the present invention, the term "belt high-load situation" refers to a situation in which the belt is under a high load, and represents at least one of, for example, a situation with a low speed-changing ratio, a situation with a high speed, and a situation with a large accelerator opening degree.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 12 is a schematic perspective view which shows the vehicle in FIG. 11.

DETAILED DESCRIPTION OF THE PREFERRED EMBODIMENTS

Figure 1:
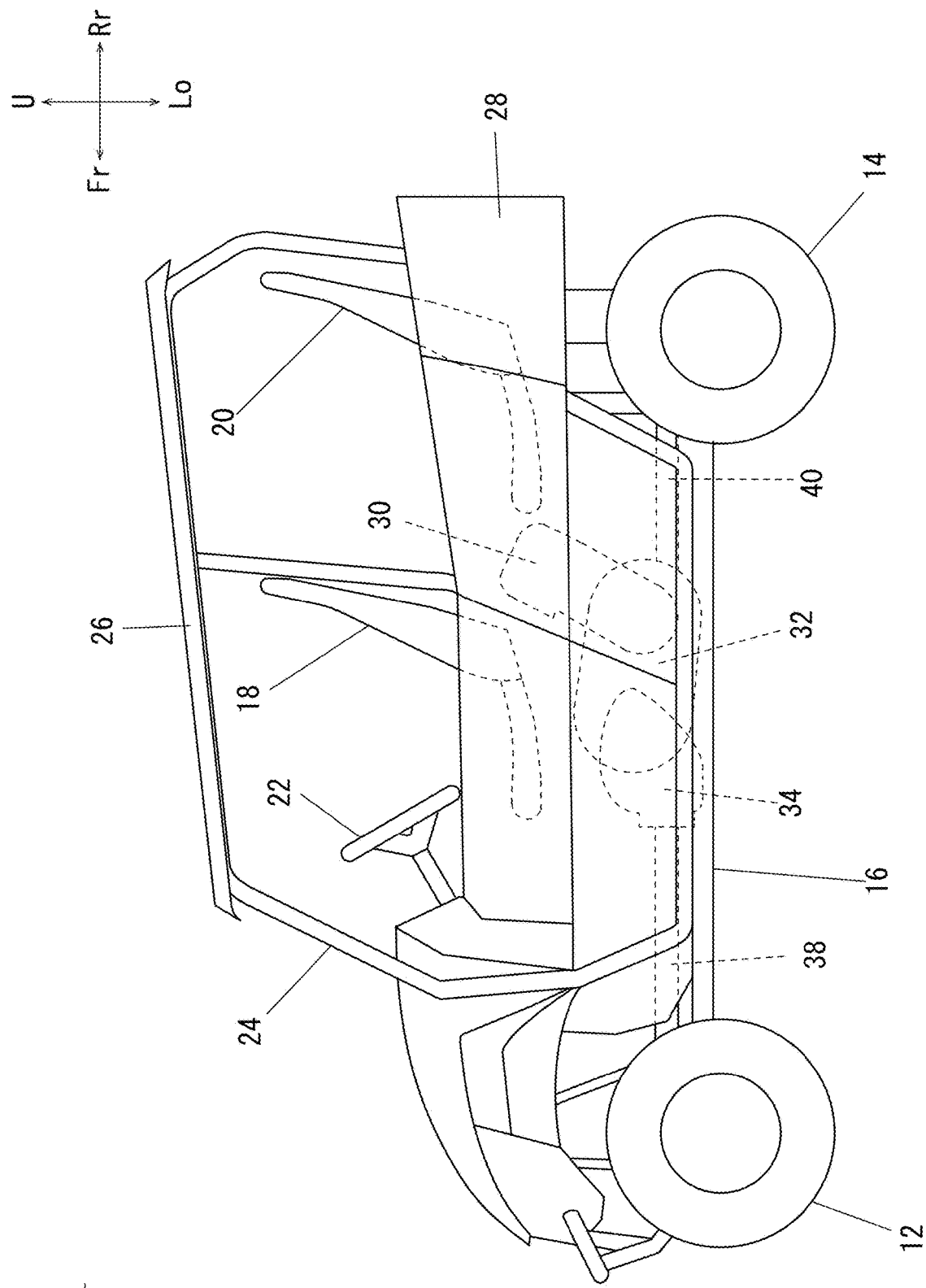
FIG. 1 is a schematic side view which shows a vehicle according to a preferred embodiment of the present invention.

Hereinafter, preferred embodiments of the present invention will be described with reference to the drawings. It should be noted here that the terms front and rear, left and right, and up and down used in the preferred embodiments of the present invention refer to front and rear, left and right, and up and down based on the state where a driver of the vehicle 10 is seated in a first seat 18a (which will be described below), facing a steering wheel 22 (which will be described below). In the drawings, "Fr" indicates forward, "Rr" indicates rearward, "R" indicates rightward, "L" indicates leftward, "U" indicates upward and "Lo" indicates downward.

Figure 2:
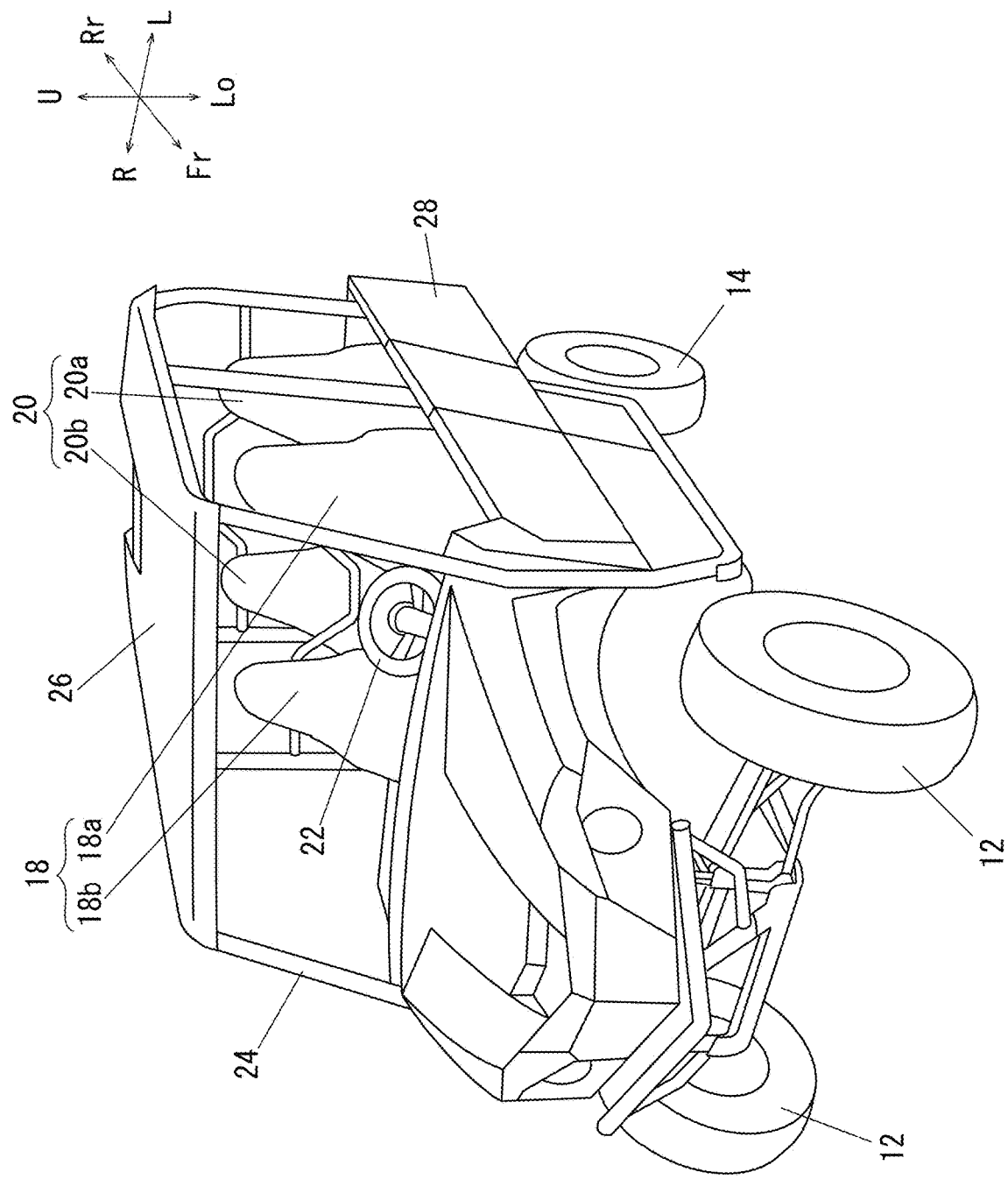
FIG. 2 is a schematic perspective view which shows the vehicle in FIG. 1.

Referring to FIG. 1 and FIG. 2, a vehicle 10 according to a preferred embodiment of the present invention is a four-seater ROV, and includes a pair of front wheels 12, a pair of rear wheels 14, a frame 16, a front seat portion 18, a rear seat portion 20, the steering wheel 22, a roll-over protection cage 24, a roof 26, and a cargo bed 28.

The frame 16 is supported by the pair of front wheels 12 and the pair of rear wheels 14 via suspension assemblies (not illustrated). The front seat portion 18 and the rear seat portion 20 are side-by-side seats. The front seat portion 18 includes the first seat 18a for the driver and a second seat 18b for a passenger arranged side by side in a left-right direction, and is provided above a continuously variable transmission 32 (which will be described below). The rear seat portion 20 is provided behind the front seat portion 18 and includes a third seat 20a and a fourth seat 20b arranged side by side in the left-right direction. The steering wheel 22 is provided ahead of the first seat 18a of the front seat portion 18. The roll-over protection cage 24 encases the front seat portion 18, the rear seat portion 20, and the steering wheel 22. The roll-over protection cage 24 is supported by the frame 16. The roof 26 is provided on top of the roll-over protection cage 24. The cargo bed 28 is provided behind the rear seat portion 20, and above the rear wheels 14.

The vehicle 10 further includes a transfer mechanism (not illustrated) which transfers a movement of the steering wheel 22 to the pair of front wheels 12. The transfer mechanism may be provided by any of various, known arrangements such as a rack and pinion transfer mechanism, so no more description will be made here.

The vehicle 10 further includes an engine 30, the belt-type continuously variable transmission (CVT) 32 provided on a side (left side in the present preferred embodiment) of the engine 30, and a gear-type transmission apparatus 34 located ahead of the engine 30. In other words, the continuously variable transmission 32 is provided on the left side of the engine 30 and the transmission apparatus 34, and the engine 30 and the transmission apparatus 34 are connected with each other via the continuously variable transmission 32. The continuously variable transmission 32 changes rotational power from the engine 30 and transmits it to the transmission apparatus 34.

The engine 30 is a water-cooled four-cycle parallel two-cylinder engine, for example, located more rearward than a front end of the front seat portion 18, ahead of a rear end of the rear seat portion 20, and near the vehicle's widthwise center. The engine 30 is slightly inclined rearward, with its crank shaft 36 (see FIG. 3) oriented in the width direction of the vehicle 10.

The vehicle 10 further includes propeller shafts 38, 40. The propeller shaft 38 extends, at a generally center portion in the width direction of the vehicle 10, and more forward than the transmission apparatus 34. The propeller shaft 40 extends farther rearward than the transmission apparatus 34.

Between the propeller shaft 38 and the pair of front wheels 12, a rotation transmission portion (not illustrated) is provided. Between the propeller shaft 40 and the pair of rear wheels 14, a rotation transmission portion (not illustrated) is provided. Therefore, rotation of the engine 30 undergoes a speed change by the continuously variable transmission 32 and the transmission apparatus 34, and is then transmitted to the pair of front wheels 12 via the propeller shaft 38 and the rotation transmission portion. This rotates the pair of front wheels 12. Also, rotation of the engine 30 undergoes a speed change by the continuously variable transmission 32 and the transmission apparatus 34, and is then transmitted to the pair of rear wheels 14 via the propeller shaft 40 and the rotation transmission portion. This rotates the pair of rear wheels 14.

Now, reference will be made to FIG. 3 and FIG. 4 to describe the continuously variable transmission 32 and the configuration of its surroundings.

The continuously variable transmission 32 includes a primary shaft 42, a secondary shaft 44, a drive pulley 46 attached to the primary shaft 42, a driven pulley 48 attached to the secondary shaft 44, and an endless belt 50 made of rubber, for example, wound around the drive pulley 46 and the driven pulley 48.

The primary shaft 42, the secondary shaft 44, and a transmission shaft 72 (which will be described below) and a middle gear shaft 74 (which will be described below) of the transmission apparatus 34 extend in a left-right direction parallel or substantially parallel to each other.

The primary shaft 42 is coaxial with the crank shaft 36 of the engine 30. The crank shaft 36 and the primary shaft 42 are connected with each other via a centrifugal clutch 52.

The centrifugal clutch 52 includes a clutch inner 54 and a clutch outer 56. The clutch inner 54 is attached to an end portion of the crank shaft 36 while the clutch outer 56 is attached to an end portion of the primary shaft 42. The centrifugal clutch 52 transmits rotational power of the crank shaft 36 to the primary shaft 42 when the crank shaft 36 rotates and an accompanying centrifugal force presses an outer circumferential surface of the clutch inner 54 onto an inner circumferential surface of the clutch outer 56.

The drive pulley 46 includes a fixed sheave 58 fixed to the primary shaft 42, and a movable sheave 60 that is axially movable on the primary shaft 42. A cam plate 62 is fixed to the primary shaft 42. Between the movable sheave 60 and the cam plate 62, there is provided a weight 64 which moves the movable sheave 60 axially by the centrifugal force accompanied with the rotation of the primary shaft 42.

The driven pulley 48 includes a fixed sheave 66 fixed to the secondary shaft 44, and a movable sheave 68 that is axially movable on the secondary shaft 44. The movable sheave 68 is urged by a coil spring 70 in the direction toward the fixed sheave 66.

Figure 3:
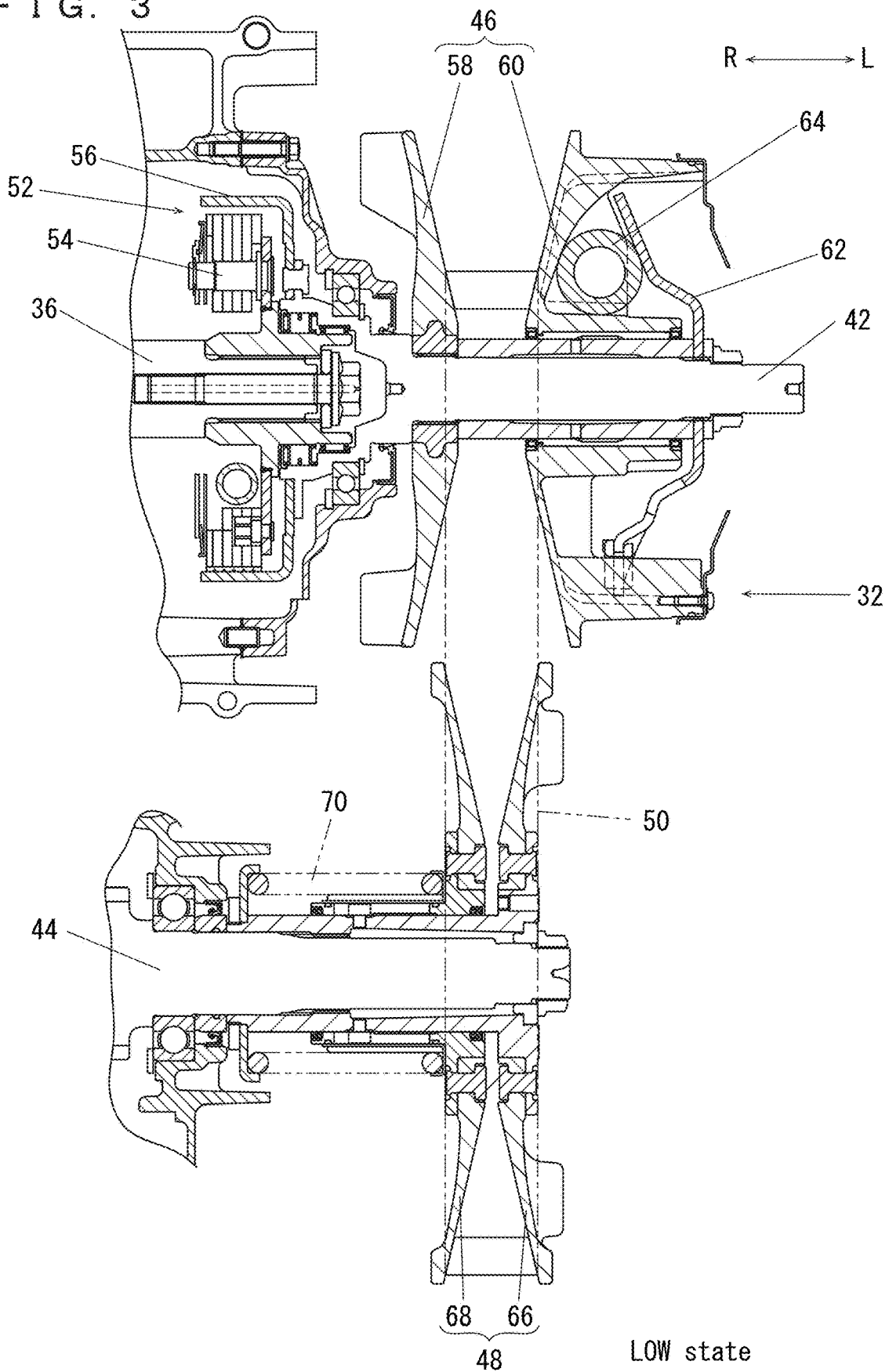
FIG. 3 is a sectional view which shows a CVT in a LOW state.

In a LOW state (slow speed range) shown in FIG. 3, the movable sheave 60 moves in a direction away from the fixed sheave 58 (moving outward), widening a groove of the drive pulley 46 while at the same time the movable sheave 68 moves in a direction approaching the fixed sheave 66 (moving outward), narrowing a groove of the driven pulley 48. As a result, the endless belt 50 has a decreased winding diameter on the side of the drive pulley 46 and an increased winding diameter on the side of the driven pulley 48, thus setting the LOW state.

Figure 4:
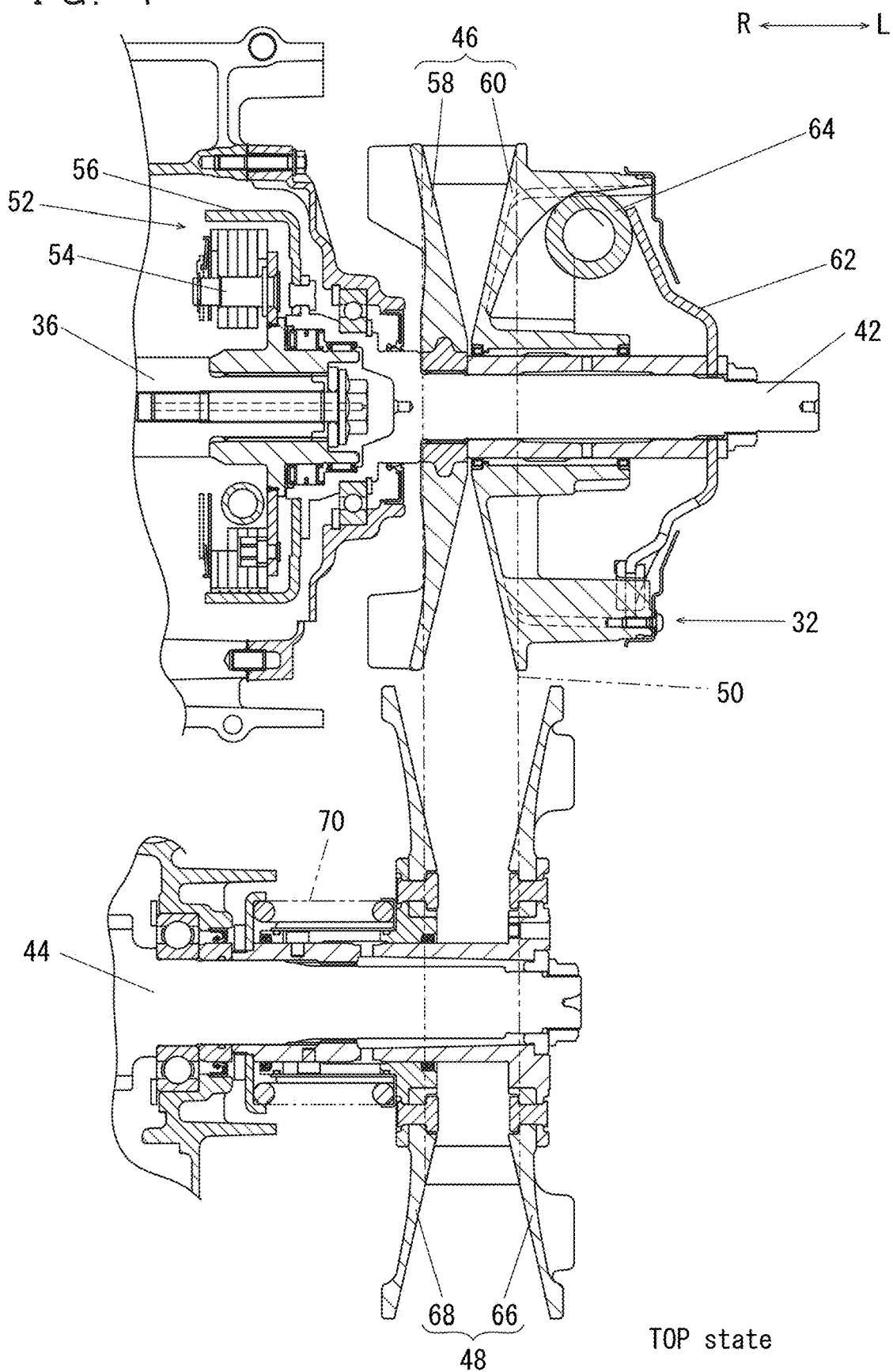
FIG. 4 is a sectional view which shows the CVT in a TOP state.

In a TOP state (high speed range) shown in FIG. 4, the movable sheave 60 moves in a direction approaching the fixed sheave 58 (moving inward), narrowing the groove of the drive pulley 46 while at the same time the movable sheave 68 moves in a direction away from the fixed sheave 66 (moving inward), widening the groove of the driven pulley 48. As a result, the endless belt 50 has an increased winding diameter on the side of the drive pulley 46 and a decreased winding diameter on the side of the driven pulley 48, thus setting the TOP state.

The rotational power of the primary shaft 42 which is connected with the crank shaft 36 of the engine 30 via the centrifugal clutch 52 undergoes stepless speed change by the continuously variable transmission 32 and then is transmitted to the transmission apparatus 34 which is connected with the secondary shaft 44.

The transmission apparatus 34 includes the transmission shaft 72 and the middle gear shaft 74 (see FIG. 5), speed-changes the rotational power of the secondary shaft 44 into one of three modes, i.e., High, Low and Reverse, and then transmits the power to the propeller shafts 38, 40. Then, as described above, the rotational power transmitted to the propeller shaft 38 is transmitted to the pair of front wheels 12 via the rotation transmission portion while the rotational power transmitted to the propeller shaft 40 is transmitted to the pair of rear wheels 14 via the rotation transmission portion.

Figure 5:
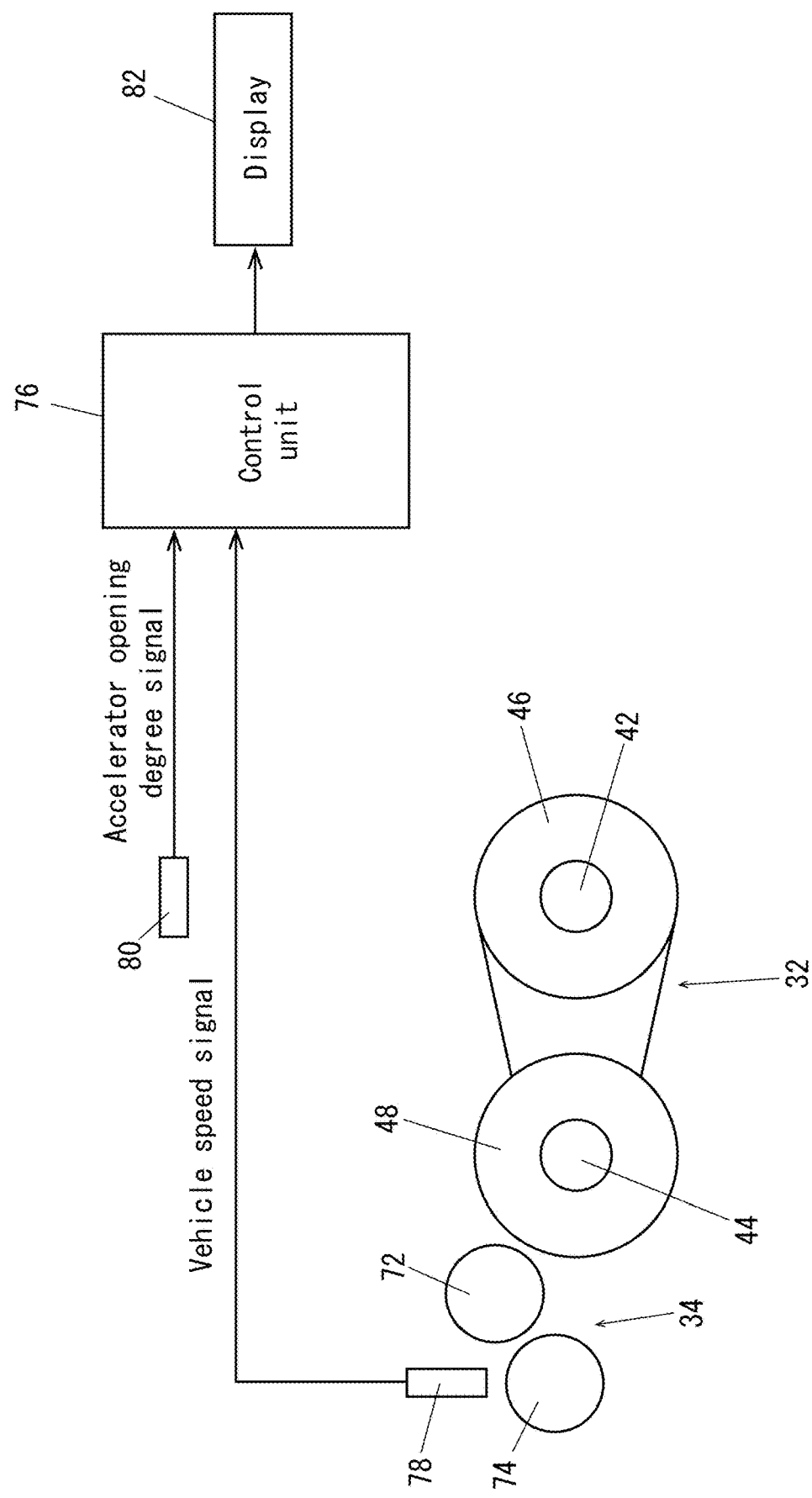
FIG. 5 is a block diagram which shows an example of a primary electric configuration of the vehicle.

Referring to FIG. 5, the vehicle 10 further includes a control unit 76, a vehicle speed sensor 78, an accelerator opening degree sensor 80, and a display 82.

The control unit 76 controls operation of the vehicle 10. The vehicle speed sensor 78 detects the number of rotations of the middle gear shaft 74 and outputs it to the control unit 76 as a vehicle speed signal. The accelerator opening degree sensor 80 detects an accelerator opening degree which indicates an amount of accelerator operation performed by the driver and outputs it to the control unit 76 as an accelerator opening degree signal. The display 82 displays various information based on instructions from the control unit 76.

In the present preferred embodiment, the engine 30 represents the prime mover. The control unit 76, the vehicle speed sensor 78, and the accelerator opening degree sensor 80 provide a detector. The control unit 76 represents the determination portion. The display 82 represents the alarm. The crank shaft 36 represents the output shaft of the prime mover.

Figure 6:
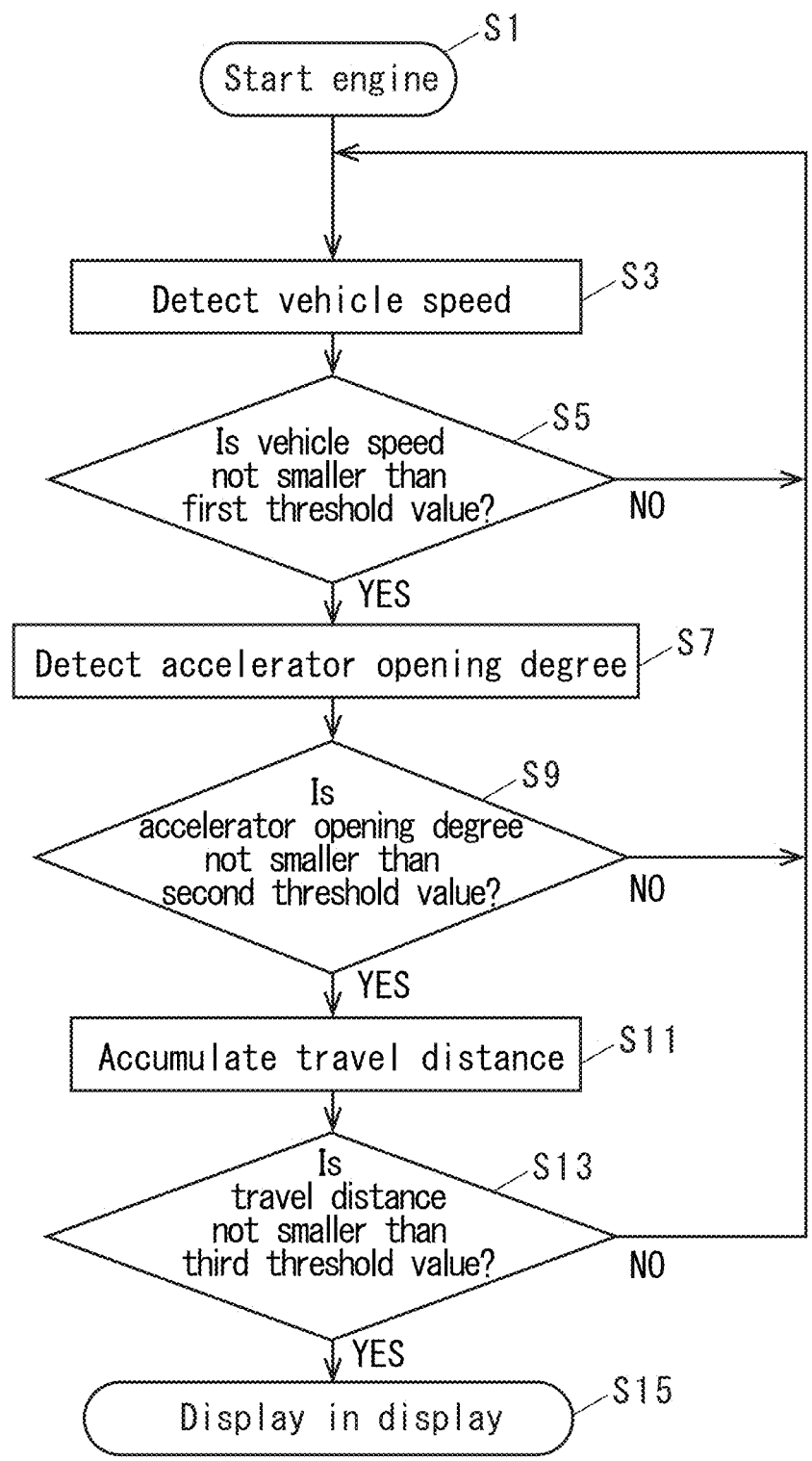
FIG. 6 is a flowchart which shows an example of the operation of the vehicle.

Referring to FIG. 6, an example of an operation of the vehicle 10 will be described.

When the engine 30 is started (step S1), the control unit 76 detects a travel speed of the vehicle 10 based on the vehicle speed signal from the vehicle speed sensor 78 (step S3), and the control unit 76 determines whether or not the travel speed is not smaller than a first threshold value (predetermined speed; e.g., any speed within a range of about 80±10 km/h) (step S5). If the travel speed is smaller than the first threshold value, the process returns to step S3. On the other hand, if the travel speed is not smaller than the first threshold value the process goes to step S7.

In step S7, the control unit 76 detects the accelerator opening degree based on accelerator opening degree signal from the accelerator opening degree sensor 80 (step S7), and the control unit 76 determines whether or not the accelerator opening degree is not smaller than a second threshold value (predetermined opening degree; e.g., any opening degree within a range of about 70±10 degrees) (step S9). If the accelerator opening degree is smaller than the second threshold value, the process returns to step S3. On the other hand, if the accelerator opening degree is not smaller than the second threshold value, the process goes to step S11. In other words, if the two conditions, i.e., the travel speed is not smaller than the first threshold value and the accelerator opening degree is not smaller than the second threshold value, are met, the control unit 76 determines that the continuously variable transmission 32 is being used in a belt high-load situation and advances the process to step S11. In step S11, the control unit 76 accumulates a travel distance in which the continuously variable transmission 32 is used in the belt high-load situation. The travel distance is calculated based on the vehicle speed signal for example. Then, the control unit 76 determines whether or not the travel distance is not smaller than a third threshold value (e.g., any distance not shorter than about 400 km) (step S13). If the travel distance is smaller than the third threshold value, the process returns to step S3. On the other hand, if the travel distance is not smaller than the third threshold value, the control unit 76 determines that the endless belt 50 is deteriorated or deterioration thereof is in an advanced stage, and deterioration of the endless belt 50 is reported on the display 82 based on an instruction from the control unit 76 (step S15). In this way, an end of life of the endless belt 50 is determined and replacement of the endless belt 50 is recommended, making it possible to replace the endless belt 50 before the endless belt 50 breaks.

Figure 7:
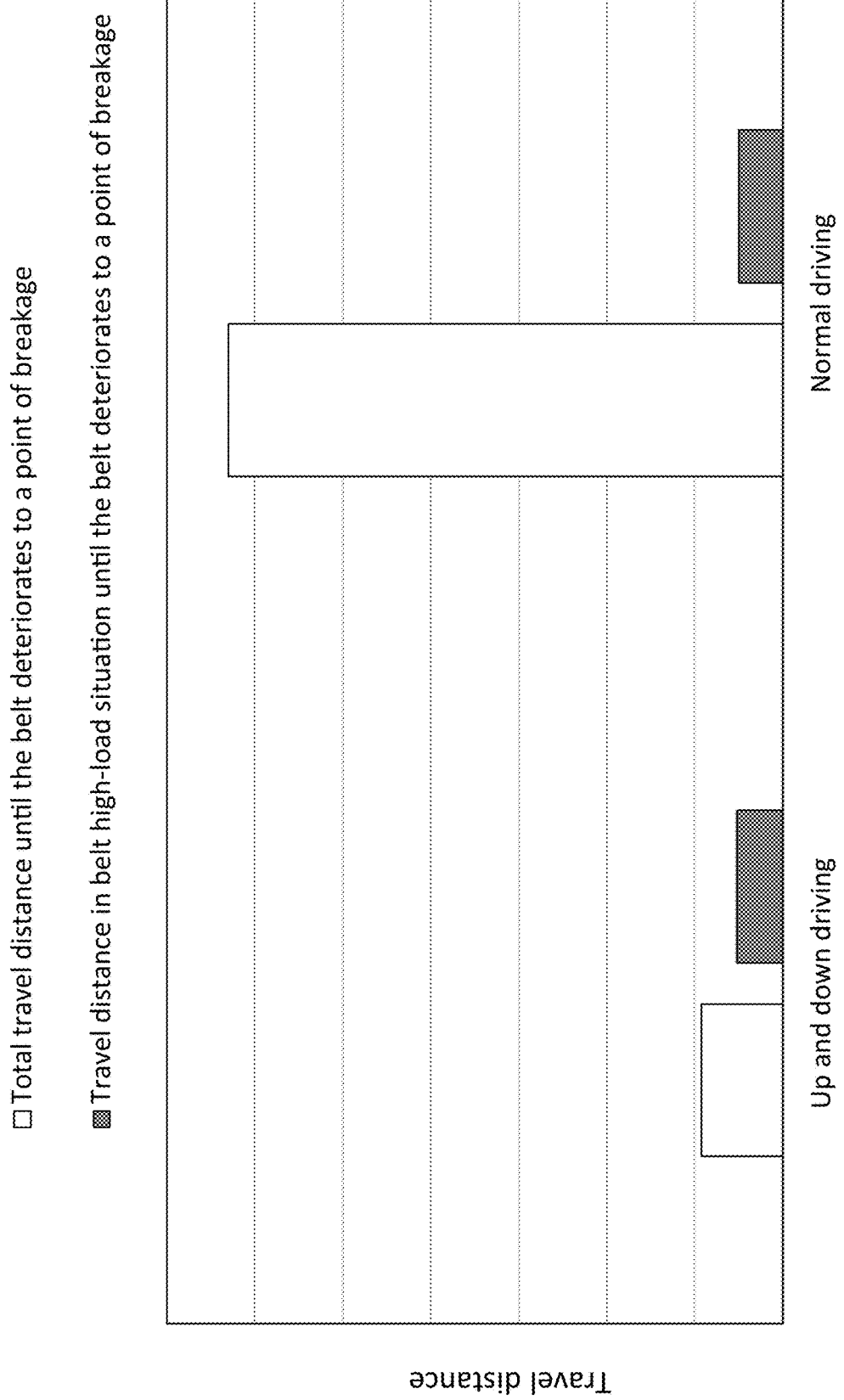
FIG. 7 is a graph which shows a relationship between travel mode and travel distance.

According to the vehicle 10 as has been described thus far, based on the fact that there is a big difference between an up and down driving and a normal driving, in a total travel distance until the endless belt 50 deteriorates to a point of breakage, and the fact that there is little difference between the up and down driving and the normal driving, in a travel distance in the belt high-load situation until the endless belt 50 deteriorates to a point of breakage (see FIG. 7), it is possible, by utilizing the accumulated value regarding the use in the belt high-load situation, to detect deterioration of the endless belt 50 easily and accurately regardless of the travel mode of the vehicle 10 such as the up and down driving and the normal driving.

Each of the two states, i.e., one in which the vehicle 10 is traveling at a speed not smaller than the first threshold value (predetermined speed), and the other in which the vehicle 10 is traveling at an accelerator opening degree not smaller than the second threshold value (predetermined opening degree) is highly correlated with deterioration of the endless belt 50, representing the belt high-load situation. Therefore, by utilizing the travel distance recorded when these two conditions, i.e., the vehicle speed is not smaller than the first threshold value and the accelerator opening degree is not smaller than the second threshold value, are met, it is possible to determine the deterioration of the endless belt 50 more accurately.

As described above, there is little difference between the up and down driving and the normal driving in the travel distance in the belt high-load situation until the endless belt 50 deteriorates to a point of breakage. Thus, by utilizing the travel distance under the belt high-load situation, it is possible to determine the deterioration of the endless belt 50 accurately.

By providing notification of the deterioration of the endless belt 50 with the display 82, it is possible to let the driver recognize the deterioration of the endless belt 50 easily.

A preferred embodiment of the present invention is suitably applied to an ROV (Recreational Off-Highway Vehicle) which is configured as described above.

Figure 8:
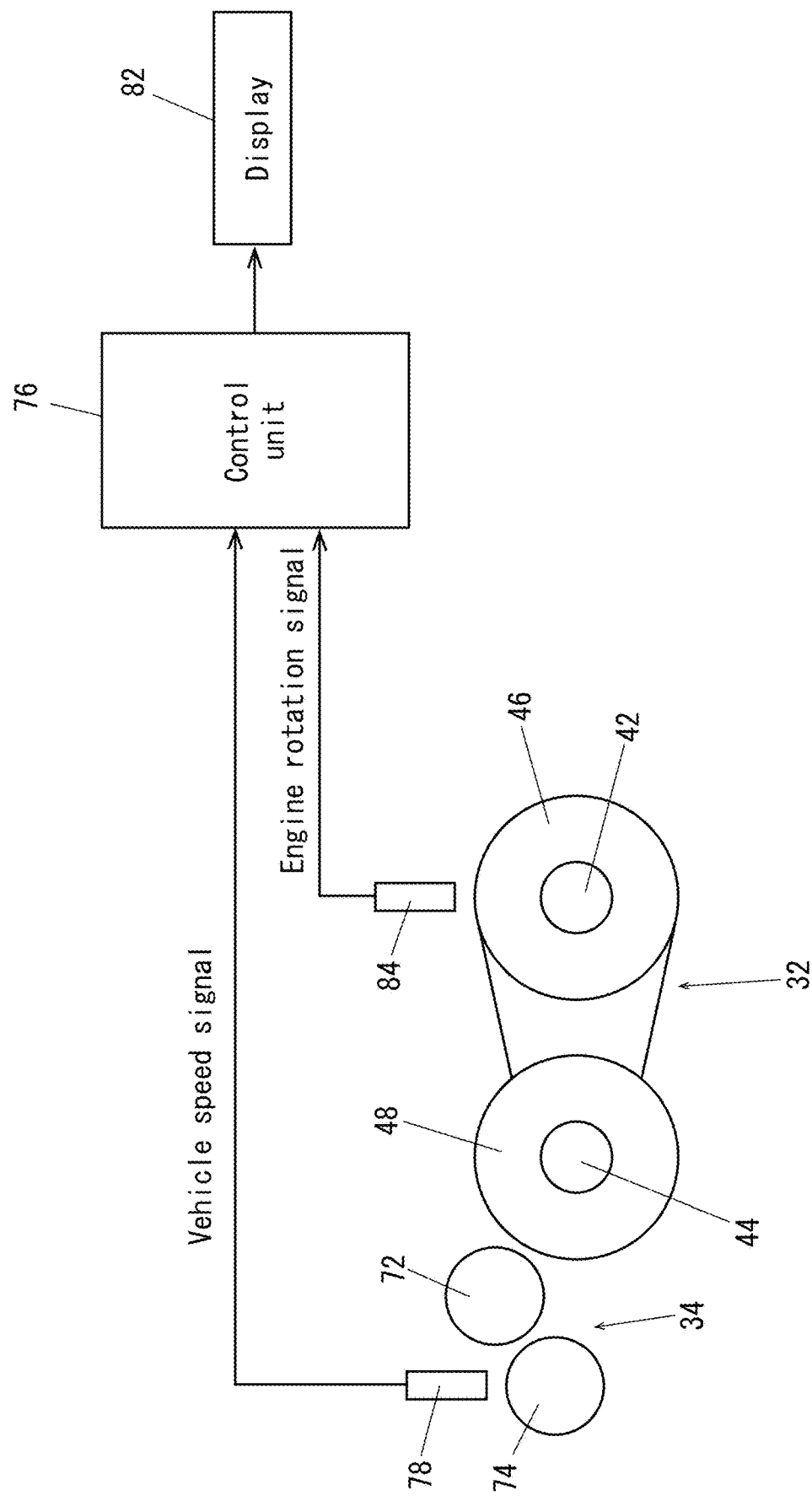
FIG. 8 is a block diagram which shows another example of a primary electric configuration of the vehicle.

Also, as shown in FIG. 8, the accelerator opening degree sensor 80 shown in FIG. 5 may be replaced with an engine revolution sensor 84. The engine revolution sensor 84 detects the number of rotations of the primary shaft 42. The primary shaft 42 operates with the crank shaft 36, and the number of rotations of the primary shaft 42 is equal to the number of rotations of the crank shaft 36. Therefore, the engine revolution sensor 84 is able to detect the number of rotations of the crank shaft 36 by detecting the number of rotations of the primary shaft 42, and the detected value is outputted to the to the control unit 76 as an engine rotation signal. All the other configurations are identical with those in the configurations shown in FIG. 5.

In the present preferred embodiment, the control unit 76, the vehicle speed sensor 78, and the engine revolution sensor 84 provide the detector.

Figure 9:
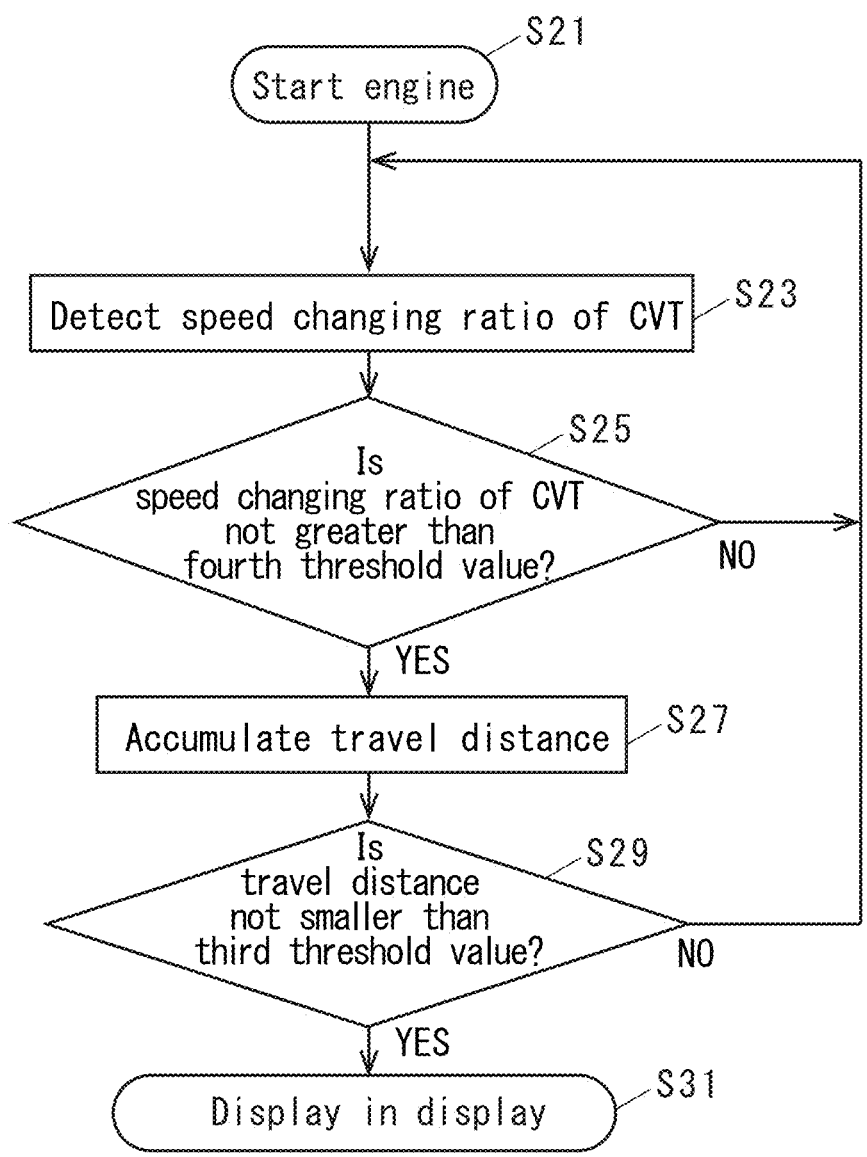
FIG. 9 is a flowchart which shows another example of the operation of the vehicle.

Referring to FIG. 9, an example of an operation of the vehicle 10 which has the configuration shown in FIG. 8 will be described.

When the engine 30 is started (step S21), the speed changing ratio of the continuously variable transmission 32 is detected (step S23). A speed changing ratio of the continuously variable transmission 32 is calculated as: (number of rotations of the primary shaft 42) divided by (the number of rotations of the secondary shaft 44). Here, it is possible to detect the number of rotations of the primary shaft 42 with the engine revolution sensor 84. Also, it is possible to calculate the number of rotations the secondary shaft 44 based on the number of rotations of the middle gear shaft 74 detected by the vehicle speed sensor 78 and the speed changing ratio of the transmission apparatus 34 as a current setting. Therefore, by using the engine revolution sensor 84 to detect the number of rotations of the primary shaft 42 and by using the vehicle speed sensor 78 to detect the number of rotations of the middle gear shaft 74, the control unit 76 calculates the speed changing ratio of the continuously variable transmission 32.

Then, the control unit 76 determines whether or not the speed changing ratio of the continuously variable transmission 32 is not greater than the fourth threshold value (predetermined value) (step S25). If the speed changing ratio is greater than the fourth threshold value, the process returns to step S23. On the other hand, the speed changing ratio is not greater than the fourth threshold value, the control unit 76 determines that the continuously variable transmission 32 is being used in the belt high-load situation, and the process goes to step S27.

In step S27, the control unit 76 accumulates the travel distance if the condition that the speed changing ratio of the continuously variable transmission 32 is not greater than the fourth threshold value is met. Then, the control unit 76 determines whether or not the travel distance is not smaller than the third threshold value (step S29). If the travel distance is smaller than the third threshold value, the process returns to step S23. On the other hand, if the travel distance is not smaller than the third threshold value, the control unit 76 determines that the endless belt 50 is deteriorated or deterioration thereof is in an advanced stage, and deterioration of the endless belt 50 is indicated on the display 82 based on an instruction from the control unit 76 (step S31). In this way, the end of the life of the endless belt 50 is determined and replacement of the endless belt 50 is recommended, making it possible to replace the endless belt 50 before the endless belt 50 breaks.

In the vehicle 10 operating as described above, the situation in which the vehicle 10 is traveling at the speed changing ratio of the continuously variable transmission 32 not greater than the fourth threshold value (predetermined value) is highly correlated with deterioration of the endless belt 50, representing the belt high-load situation. Therefore, by utilizing the travel distance in the case that the vehicle 10 is traveling with the speed changing ratio of the continuously variable transmission 32 not greater than the fourth threshold value, it is possible to determine the deterioration of the endless belt 50 accurately.

It should be noted here that in the configuration shown in FIG. 8, there may be an arrangement that the control unit 76 further calculates a change of the speed changing ratio of the continuously variable transmission 32 for the display 82 to display the change of the speed changing ratio of the continuously variable transmission 32.

Figure 10:
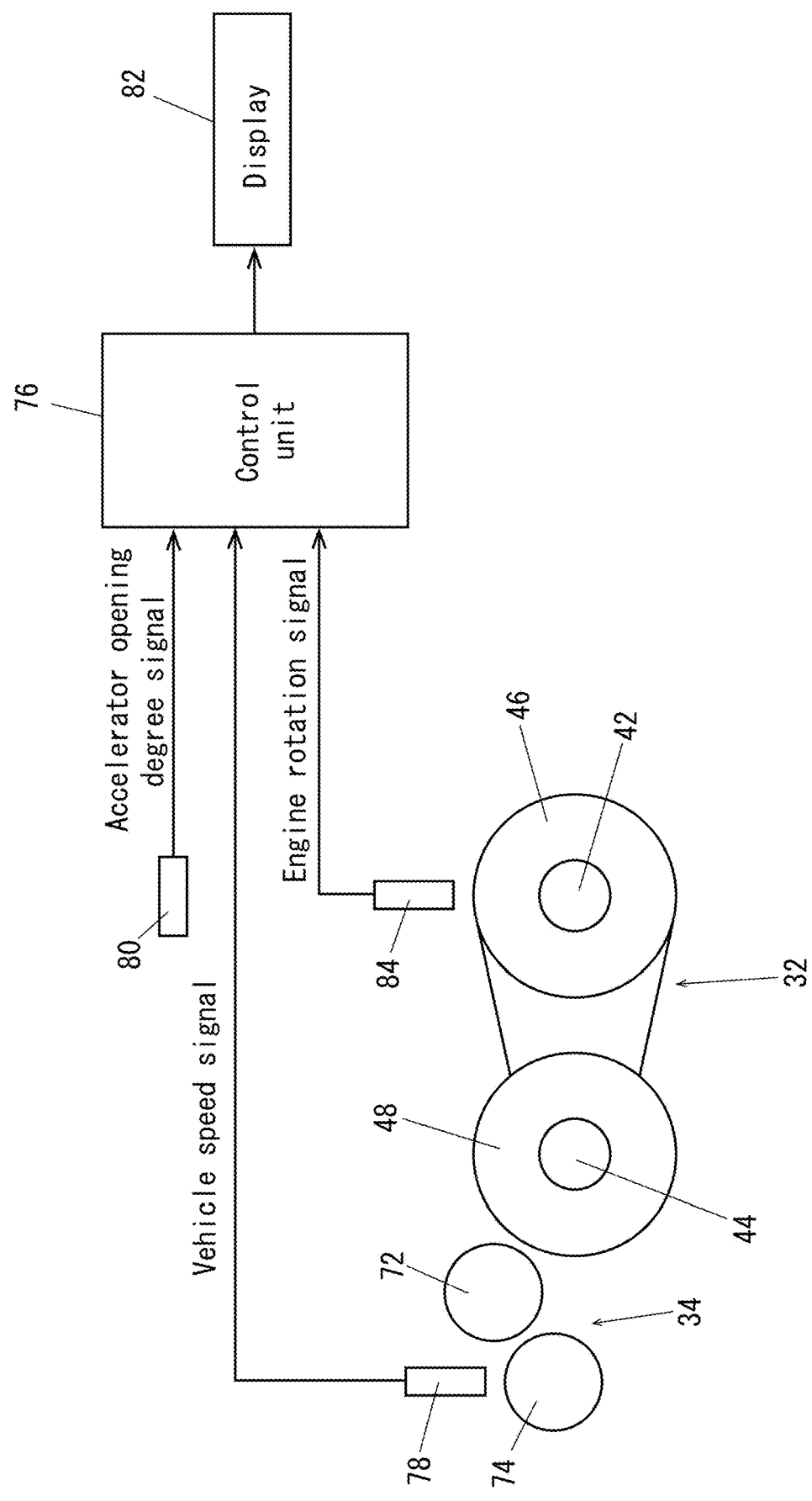
FIG. 10 is a block diagram which shows still another example of a primary electric configuration of the vehicle.

Also, as shown in FIG. 10, there may be an arrangement that the configuration shown in FIG. 5 further includes the engine revolution sensor 84 to detect of the number of rotations of the primary shaft 42. In this case, it becomes possible to further calculate the change in the speed changing ratio of the continuously variable transmission 32 with the control unit 76 and further display the change on the display 82.

The arrangement enables the driver to recognize conditions of the endless belt 50 by further taking information indicating the changes of the speed changing ratio of the continuously variable transmission 32 into consideration. In other words, it becomes possible to estimate the life of the endless belt 50 more accurately by taking into consideration the change in the speed changing ratio in addition to the travel distance in the belt high-load situation.

There may be an arrangement that the configuration shown in FIG. 8 further includes the accelerator opening degree sensor 80 to detect the accelerator opening degree. In this case, there may be an arrangement that if the control unit 76 determines that deceleration is underway based on the accelerator opening degree, then it does not determine this deceleration as the belt high-load situation and therefore does not accumulate the travel distance even if the speed changing ratio of the continuously variable transmission 32 is not greater than the fourth threshold value (predetermined value).

Figure 11:
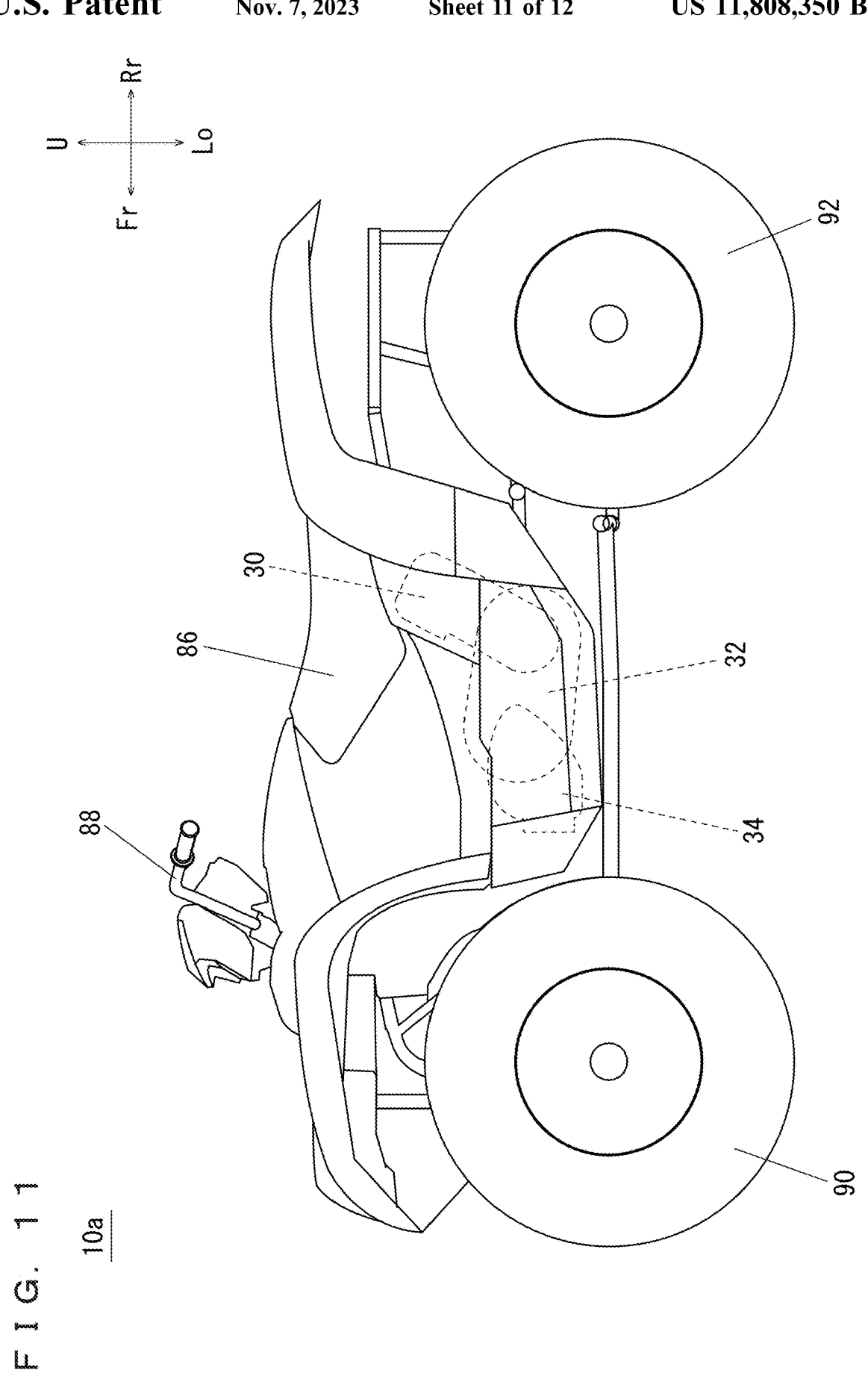
FIG. 11 is a schematic side view which shows a vehicle according to another preferred embodiment of the present invention.

Also, a preferred embodiment of the present invention is applicable to a vehicle 10a as shown in FIG. 11 and FIG. 12. The vehicle 10a is a saddle type vehicle, and more specifically a four-wheeled ATV. The vehicle 10a includes a straddle seat 86 provided above the continuously variable transmission 32, a bar handle 88 provided at a higher position than the straddle seat 86, and a pair of front wheels 90 and a pair of rear wheels 92 provided at a position lower than the bar handle 88.

A preferred embodiment of the present invention is suitably applied to an ATV which is configured as above.

In a preferred embodiment of the present invention described above, the prime mover is provided by the engine 30. However, the present invention is not limited to this. The prime mover may be provided by an electric motor.

In a preferred embodiment of the present invention described above, the accumulated value regarding the use in the belt high-load situation is provided by the travel distance in the belt high-load situation. However, the present invention is not limited to this, and the value may be provided by a travel time in the belt high-load situation.

In the configurations shown in FIG. 5 and FIG. 10, the accelerator opening degree sensor may be replaced by a throttle opening degree sensor which detects a throttle opening degree that indicates how much the throttle valve (not illustrated) is open. In this case, the accelerator opening degree and the throttle opening degree are highly correlated with each other, and therefore it is possible, based on the throttle opening degree detected by the throttle opening degree sensor, to determine whether or not the current situation is the belt high-load situation.

In the configuration shown in FIG. 5, the vehicle speed of the vehicle 10 is detected based on the vehicle speed signal from the vehicle speed sensor 78. However, the present invention is not limited to this. A GPS system may be used to detect the vehicle speed.

In the configuration shown in FIG. 8, the number of rotations of the secondary shaft 44 is detected based on the number of rotations of the middle gear shaft 74 detected by the vehicle speed sensor 78. However, the present invention is not limited to this. The number of rotations of the secondary shaft 44 may be detected directly.

In the configuration shown in FIG. 10, the vehicle speed sensor 78 may be replaced by a GPS system to detect the vehicle speed, with a further arrangement of direct detection of the number of rotations of the secondary shaft 44.

In the operation example shown in FIG. 6, two conditions must be met, i.e., the vehicle speed must be not smaller than the first threshold value and the accelerator opening degree is not smaller than the second threshold value, to determine that the continuously variable transmission 32 is being used in the belt high-load situation. However, the present invention is not limited to this. If either condition, i.e., the vehicle speed is not smaller than the first threshold value or the accelerator opening degree is not smaller than the second threshold value, is met, it may be determined that the continuously variable transmission 32 is being used in the belt high-load situation. In this case, too, it is possible to determine the deterioration of the endless belt 50 accurately.

The endless belt 50 may be made of a metal or a resin, for example.

The alarm is not limited to the display 82 but may be an output portion which outputs sounds, messages and so on.

In the vehicle 10 shown in FIG. 1, the front seat portion 18 is provided above the continuously variable transmission 32. However, the present invention is not limited to this. The front seat portion may be provided ahead of the continuously variable transmission or behind thereof.

Also, in the vehicle 10a shown in FIG. 11, the straddle seat 86 is provided above the continuously variable transmission 32. However, the present invention is not limited to this. The straddle seat may be provided ahead of the continuously variable transmission or behind thereof.

The vehicle according to a preferred embodiment of the present invention may have three or more wheels.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
a prime mover;
a continuously variable transmission including an endless belt to output a power from the prime mover;
a detector to detect use of the continuously variable transmission in a belt high-load situation; and
a controller configured or programmed to determine a deterioration of the endless belt based only on an accumulated value regarding the use of the continuously variable transmission only in the belt high-load situation detected by the detector.

2. The vehicle according to claim 1, wherein the belt high-load situation includes a situation in which the vehicle travels at a speed not slower than a predetermined speed.

3. The vehicle according to claim 1, wherein the belt high-load situation includes a situation in which the vehicle travels at an accelerator opening degree not smaller than a predetermined degree.

4. The vehicle according to claim 1, wherein the belt high-load situation includes a situation in which the vehicle travels at a speed changing ratio of the continuously variable transmission not greater than a predetermined value.

5. The vehicle according to claim 1, wherein the accumulated value includes a travel distance in the belt high-load situation.

6. The vehicle according to claim 1, further comprising an alarm to provide notification of a deterioration of the endless belt.

7. The vehicle according to claim 6, wherein the alarm provides notification of a change in a speed changing ratio of the continuously variable transmission.

8. The vehicle according to claim 1, further comprising a transmission to receive power from the continuously variable transmission.

9. The vehicle according to claim 1, wherein
the prime mover includes an output shaft; and
the continuously variable transmission includes a primary shaft coaxial with the output shaft.

10. The vehicle according to claim 1, further comprising a side-by-side seat above or ahead of the continuously variable transmission.

11. The vehicle according to claim 1, further comprising:
a straddle seat above or ahead of the continuously variable transmission;
a bar handle higher than the straddle seat; and
three or more wheels lower than the bar handle.

12. The vehicle according to claim 1, wherein the accumulated value includes a travel time in the belt high-load situation.

* * * * *